US011337209B2

(12) United States Patent
Chang et al.

(10) Patent No.: US 11,337,209 B2
(45) Date of Patent: May 17, 2022

(54) APPARATUS AND METHOD OF COOPERATING WITH MULTIPLE BASE STATIONS IN WIRELESS COMMUNICATION SYSTEM

(71) Applicant: Samsung Electronics Co., Ltd., Suwon-si (KR)

(72) Inventors: Young-Bin Chang, Anyang-si (KR); Rakesh Taori, Suwon-si (KR); Hyun-Jeong Kang, Seoul (KR); Jung-Shin Park, Seoul (KR); Yeong-Moon Son, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/711,302

(22) Filed: Dec. 11, 2019

(65) Prior Publication Data
US 2020/0112952 A1  Apr. 9, 2020

Related U.S. Application Data

(63) Continuation of application No. 13/907,414, filed on May 31, 2013, now Pat. No. 10,536,939.

(30) Foreign Application Priority Data

May 31, 2012 (KR) .................... 10-2012-0058756

(51) Int. Cl.
*H04W 72/04* (2009.01)
*H04W 56/00* (2009.01)
(Continued)

(52) U.S. Cl.
CPC ....... *H04W 72/0426* (2013.01); *H04L 5/0035* (2013.01); *H04W 24/08* (2013.01);
(Continued)

(58) Field of Classification Search
CPC ..... H04L 47/782; H04L 47/805; H04L 67/16; H04L 29/06; H04L 29/05027;
(Continued)

(56) References Cited

U.S. PATENT DOCUMENTS 6,940,831 B1   9/2005 Omi et al.
2007/0092046 A1  4/2007 Lee
(Continued)

FOREIGN PATENT DOCUMENTS

CN    101366205 A    2/2009
CN    101400139 A    4/2009
(Continued)

OTHER PUBLICATIONS

Office Action dated Oct. 25, 2019 in connection with Chinese Patent Application No. 201710622910.7, 54 pages.
(Continued)

*Primary Examiner* — Natasha W Cosme

(57) ABSTRACT

A method and an apparatus of cooperating with a plurality of base stations in a wireless communication system. A cloud cell is configured with a plurality of base stations that cooperate with each other for a mobile station and synchronizes user contexts for serving the mobile station among the plurality of base stations included in the cloud cell, and the plurality of base stations cooperate with each other to provide a communication service to the mobile station. The present disclosure reduces generation of a handover when the mobile station moves between base stations, and increases the data yield of the mobile station by transmitting and receiving data in cooperation with base stations in a cloud cell at a shaded area or a cell border.

20 Claims, 15 Drawing Sheets

(51) Int. Cl.
| | |
|---|---|
| *H04W 24/08* | (2009.01) |
| *H04W 24/10* | (2009.01) |
| *H04W 72/12* | (2009.01) |
| *H04W 88/08* | (2009.01) |
| *H04W 36/08* | (2009.01) |
| *H04L 5/00* | (2006.01) |
| *H04W 36/00* | (2009.01) |

(52) U.S. Cl.
CPC ..... *H04W 24/10* (2013.01); *H04W 36/00835* (2018.08); *H04W 56/0005* (2013.01); *H04W 56/0015* (2013.01); *H04W 72/0413* (2013.01); *H04W 72/1289* (2013.01); *H04W 36/08* (2013.01); *H04W 88/08* (2013.01)

(58) Field of Classification Search
CPC ....... H04L 45/00; H04L 45/30; H04L 45/302; H04L 45/3065; H04L 47/20; H04L 47/2408; H04L 47/2458; H04L 47/6275; H04L 65/1006
USPC ................ 370/252, 331, 332, 329; 455/436; 709/224, 226, 54
See application file for complete search history.

(56) References Cited

U.S. PATENT DOCUMENTS

| | | | |
|---|---|---|---|
| 2008/0031184 A1* | 2/2008 | Seo .................. | H04M 1/72412 370/328 |
| 2009/0239570 A1 | 9/2009 | Koyanagi et al. | |
| 2010/0042716 A1 | 2/2010 | Farajidana et al. | |
| 2010/0157901 A1 | 6/2010 | Sanderovitz et al. | |
| 2010/0220671 A1 | 9/2010 | Guillouard et al. | |
| 2011/0038436 A1* | 2/2011 | Kim .................... | H04B 7/0621 375/260 |
| 2011/0051640 A1 | 3/2011 | Ramesh et al. | |
| 2011/0103277 A1* | 5/2011 | Watfa ................ | H04W 36/0033 370/310 |
| 2011/0255526 A1 | 10/2011 | Kaneko et al. | |
| 2012/0002637 A1 | 1/2012 | Adjakple et al. | |
| 2012/0020319 A1 | 1/2012 | Song et al. | |
| 2012/0044978 A1 | 2/2012 | Wang et al. | |
| 2013/0215772 A1 | 8/2013 | Kaur et al. | |
| 2014/0119312 A1 | 5/2014 | Doetsch et al. | |

FOREIGN PATENT DOCUMENTS

| | | |
|---|---|---|
| CN | 102014492 A | 4/2011 |
| KR | 10-2012-0002537 A | 1/2012 |
| WO | 2009/024018 A1 | 2/2009 |

OTHER PUBLICATIONS

Office Action dated Jun. 14, 2017 in connection with U.S. Appl. No. 15/482,664, 26 pages.
Hyukjoon Lee, "Transmission Modes for Multi-Radio Access in Hierarchical Networks", Nov. 5, 2011, 7 pages.
Seungbae Kim, et al., "Text proposal for usage of multiple frequencies/carriers to avoid inter-tier interference in hierarchical networks", Nov. 9, 2011, 3 pages.
Yong-Up Jang, et al., "Text proposal for cooperative small base-stations in Hierarchical Networks", Sep. 16, 2011 , 3 pages.
Jinyoung Chun, et al., "Text proposal in Single-RAT on Study Report on Hierarchical Networks", Mar. 15, 2011 , 6 pages.
Inuk Jung, et al., "Hierarchical Network Study Report", Nov. 9, 2011 , 32 pages.
International Search Report dated Sep. 25, 2013 in connection with International Patent Application No. PCT/ KR2013/004811.
Written Opinion of the International Searching Authority dated Sep. 25, 2013 in connection with International Patent Application No. PCT/KR2013/004811.
Extended European Search Report issued for EP 13797720.3 dated Dec. 15, 2016, 6 pgs.
Irmer, Ralf et al., "Coordinated Multipoint: Concepts, Performance, and Field Trial Results", IEEE Communications Magazine, IMT-Advanced and Next Generation Mobile Networks, vol. 49, No. 2, dated Nov. 9, 2011, pp. 102-111.
Office Action dated Jan. 11, 2018 in connection with U.S. Appl. No. 15/482,664, 28 pages.
Communication from a foreign patent office in a counterpart foreign application, KIPO, Notification of the Reasons for Rejection for Application No. KR 10-2012-0058756, Jun. 26, 2018, 6 pages.
Foreign Communication From a Related Counterpart Application, Chinese Application No. 201380035285.6, Text of the First Office Action dated Jan. 4, 2017, 48 pages.

* cited by examiner t = T1: BS2 assigned for TX/RX t = T2 > T1: BS1 assigned for TX/RX t = T3 > T2: BS2 and BS3 assigned for Joint TX/RX t = T4 > T3: All BSs assigned for TX/RX t = T1: Cloud cell for MS t = T2 > T1: Reformed cloud cell for MS

APPARATUS AND METHOD OF COOPERATING WITH MULTIPLE BASE STATIONS IN WIRELESS COMMUNICATION SYSTEM

CROSS-REFERENCE TO RELATED APPLICATIONS

The present application is a continuation of U.S. patent application Ser. No. 13/907,414 filed on May 31, 2013, which is related to and claims priority under 35 U.S.C. § 119(a) to Korean Patent Application No. 10-2012-0058756 filed on May 31, 2012 in the Korean Intellectual Property Office, the disclosures of which are herein incorporated by reference in their entirety.

TECHNICAL FIELD

The present disclosure relates to transmission and reception of information in a communication system, and more particularly, to a method and an apparatus of serving a mobile station in cooperation with a plurality of base stations in a wireless communication system.

BACKGROUND

In a cellular system for a wireless communication, a cell which is a service area for transmitting a wireless signal of each base station tends to decrease in size, for various reasons, such as the increase of path loss caused by the usage of the high frequency and the provision of a MS-centric service. The small base stations for the small cell may be designed to be smaller in size and simpler in structure than a macro base station generally having a radius of 1 km.

A wireless communication system configured with a small cell may have a capacity of wireless resources that can be provided for a mobile station per area to be increased on average compared to a macro base station, but may have a density of cell borders higher than the macro cell. That is, if a service area of one macro base station is substituted with multiple small base stations, many cell borders may be generated among small base stations.

The increase of cell border areas in the small cells leads to an increase in the frequency of handovers. In general, since the data yield at a cell border is smaller than the yield at a position which is not a cell border, the fixed mobile station in a small base station may have higher data yield than the macro base station, but the mobile station moving in the small base station may undergo the decrease of the data yield at a cell border and handover at a higher frequency than the macro base station. In general, the process of a handover is known as a cause of increasing a probability of data transmission error and increasing overhead in a system.

Therefore, a technique for solving problems generated in a system configured with small base stations has been required.

SUMMARY

To address the above-discussed deficiencies, it is a primary object to provide a method and an apparatus of transmitting and receiving information in a communication system.

The present disclosure provides a method and an apparatus for decreasing handovers generated at cell borders and improving the data yield decrease effect in a wireless communication system configured with small cells.

The present disclosure provides a method and an apparatus for serving a mobile station in cooperation with a plurality of base stations in a wireless communication system configured with small cells.

The present disclosure provides a method and an apparatus for configuring a user-centric virtual cell in a cellular communication system.

The present disclosure provides a method and an apparatus for configuring a plurality of base stations into a virtual cell for a mobile station in a cellular communication system.

An aspect of the present disclosure is to provide a method of cooperating with a plurality of base stations in a wireless communication system. The method includes configuring a cloud cell including a plurality of base stations that cooperate for a mobile station; synchronizing user contexts for serving the mobile station among the plurality of base stations included in the cloud cell, and providing a communication service to the mobile station by cooperation of the plurality of base stations.

Another aspect of the present disclosure is to provide a wireless communication system including a mobile station that is provided with a communication service, and a plurality of base stations that share user contexts synchronized for serving the mobile station and providing a communication service to the mobile station by configuring a cloud cell for the mobile station and cooperating with each other.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Hereinafter, various embodiments of the present disclosure will be described with reference to the accompanying drawings. Further, various specific definitions found in the following description are provided only to help general understanding of the present disclosure, and it is apparent to those skilled in the art that various changes in form and details may be made therein without departing from the scope of the present disclosure as defined by the appended claims. Further, in the following description of the present disclosure, a detailed description of known functions and configurations incorporated herein will be omitted when it may make the subject matter of the present disclosure rather unclear. Therefore, the definitions thereof should be made based on the whole description.

Figure 1A:
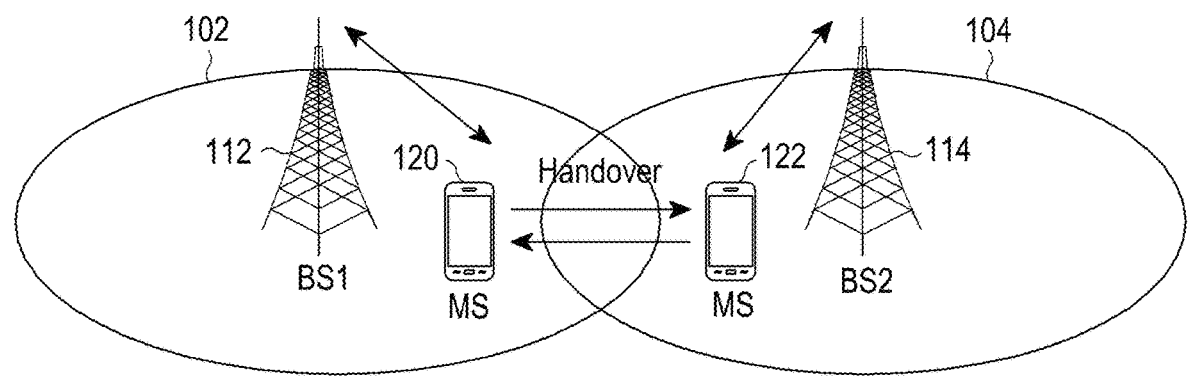
FIGS. 1A and 1B illustrate a cellular system including macro base stations and a cellular system including small base stations.
Figure 1B:
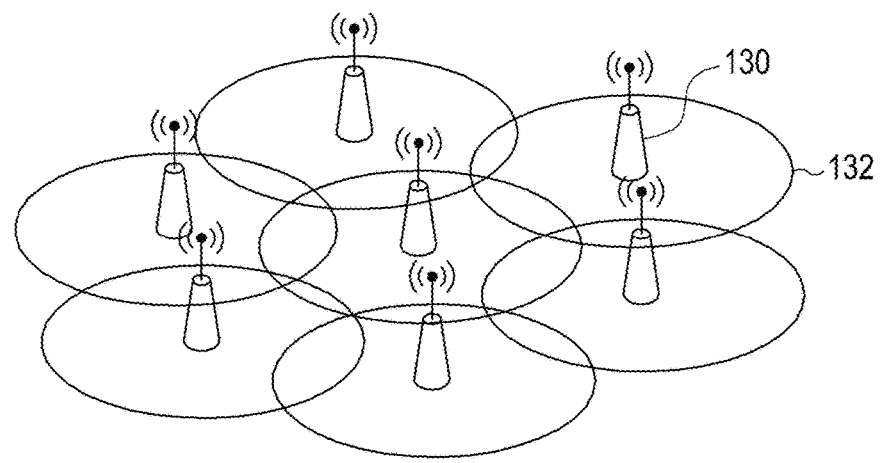

FIGS. 1A and 1B illustrate a cellular system including macro base stations and a cellular system including small base stations.

With reference to FIG. 1A, a plurality of base stations configuring a wireless communication system has a relatively wide service area, and provide a communication service such as a data or a voice communication for one MS or more positioned in the service areas of the base stations. Specifically, BS1 (Base Station 1) 112 includes a cell1 102 which is a service area of the BS1 112, and provides a communication service to an MS (Mobile Station) 120 positioned in the cell1 102. If the MS 120 enters a cell2 104 which is a service area of a BS2 114 (122), a MS 122 uses a communication service from the BS2 114. In this manner, the MS 120 performs a handover in order to move to another BS (that is, the BS2 114) which is not currently in service and receive a service.

FIG. 1B illustrates a cellular system including small BSs. As illustrated, more small BSs and their cells 132 than in FIG. 1A are arranged in the same dimension, and an MS moves among the cells 132, and uses a communication service from one of the small BSs 130.

FIG. 1A illustrates a wireless network system centered on macro BSs 112 and 114 each of which has a cell area with a radius of 1 km or more, but a wireless network system centered on the small BSs 130 which have a cell area with a smaller radius than macro BSs in order to increase the capacity of the system is more advantageous. However, in the system configured mainly with small BSs, the hand-over frequency may increase, and a data yield in many cell borders may decrease.

In order to solve the problems that occur in cell borders in a mobile communication system configured with small cells, a cloud cell may be provided. The cloud cell is a user-centric or MS-centric virtual cell, and is configured with a plurality of cooperative BSs. An MS may transmit or receive signals from any BSs that configure a cloud cell thereof, and the BSs that configure the cloud cell may continuously change according to the movement of the MS, or the change of the wireless environment.

In a wireless communication system, by using a cloud cell, a handover does not occur even when an MS moves among BSs, and data is transmitted or received in a cooperative manner of the BSs in the cloud cell so that the decrease of the data yield of the MS may be reduced or minimized.

Figure 2A:
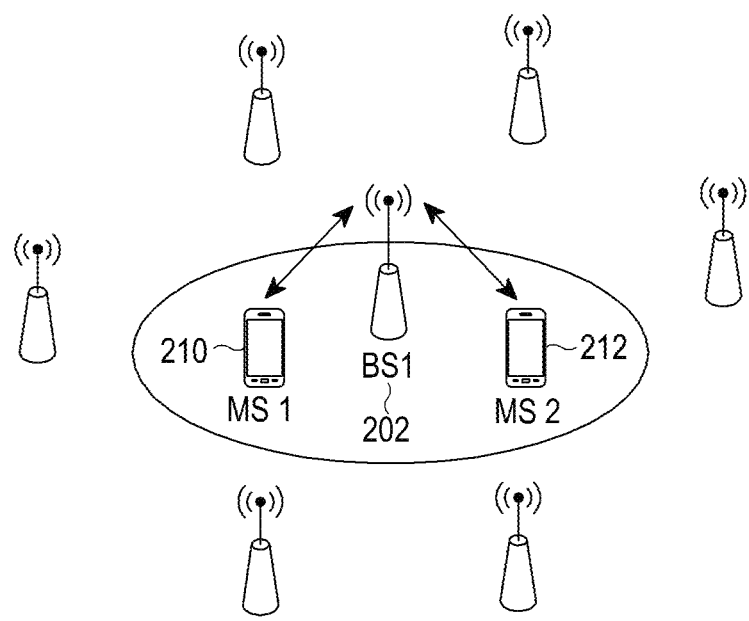
FIG. 2A illustrates a structure of a BS-centric static cell according to an embodiment of the present disclosure.
Figure 2B:
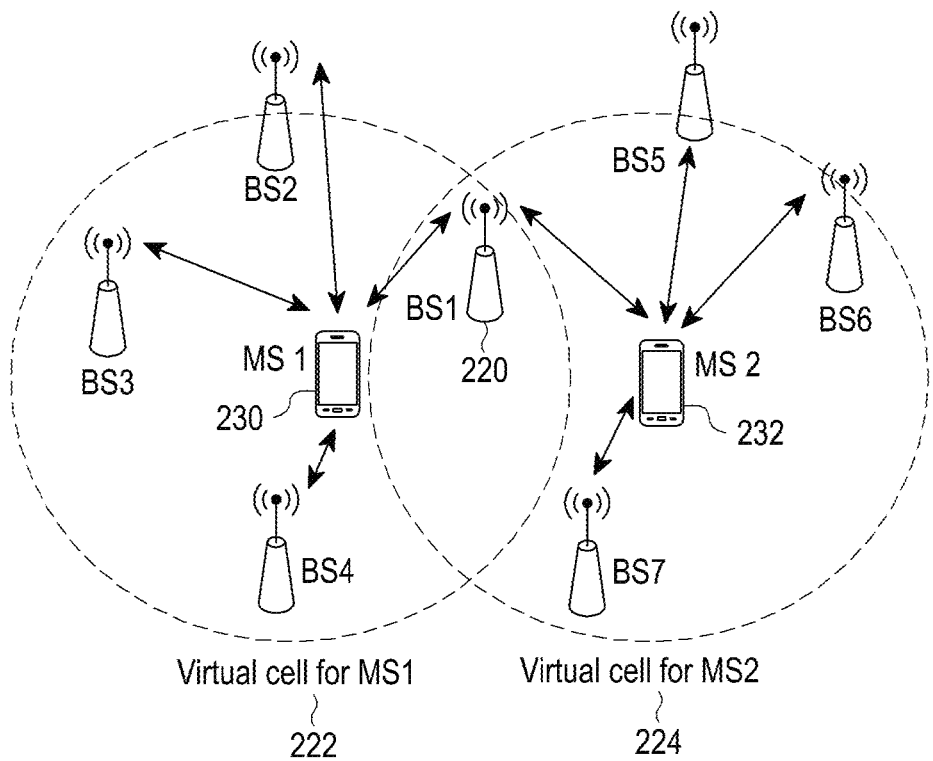
FIG. 2B illustrates a structure of a user-centric or MS-centric virtual cell according to an embodiment of the present disclosure.

FIG. 2A illustrates a structure of a BS-centric static cell, and FIG. 2B is a diagram illustrating a structure of a user-centric or MS-centric virtual cell according to an embodiment of the present disclosure.

With reference to FIG. 2A, an MS1 210 and an MS2 212 receive a service from a BS1 (Base Station 1) 202, and the service areas of the MS1 210 and the MS2 212 are determined only by the BS1 202. If the MS1 210 or the MS2 212 desires to receive a service from another BS (for example, a BS3) other than the BS1 202, the MS1 210 or the MS2 212 should move to the BS3, and the BS1 202 no longer serves the MS1 210 and the MS2 212 after the handover.

With reference to FIG. 2B, an MS1 230 and an MS2 232 may receive the best signal from a BS1 (Base Station 1) 220 as illustrated in FIG. 2A. In the cloud cell structure, a user-centric virtual, not a BS-centric cell may be formed, so a virtual cell 222 for the MS1 230 may be configured with a BS1 220, a BS2 (Base Station 2), a BS3 (Base Station 3), and a BS4 (Base Station 4), and a virtual cell 224 for the MS2 232 may be configured with the BS1 220, a BS5 (Base Station 5), a BS6 (Base Station 6), and a BS7 (Base Station 7). That is, the virtual cells 222 and 224 of the MSs 230 and 232 are not determined in a bandwidth of a signal of one BS, but are formed by including one BS or more that can transmit or receive signals in an MS-centric manner. The virtualization is performed in the MAC (Media Access Control) layer, which is Layer 2, so that virtual cells 222 and 224 operate like one BS in view of an MS, though the virtual cells 222 and 224 are configured with one or more BSs.

Figure 3:
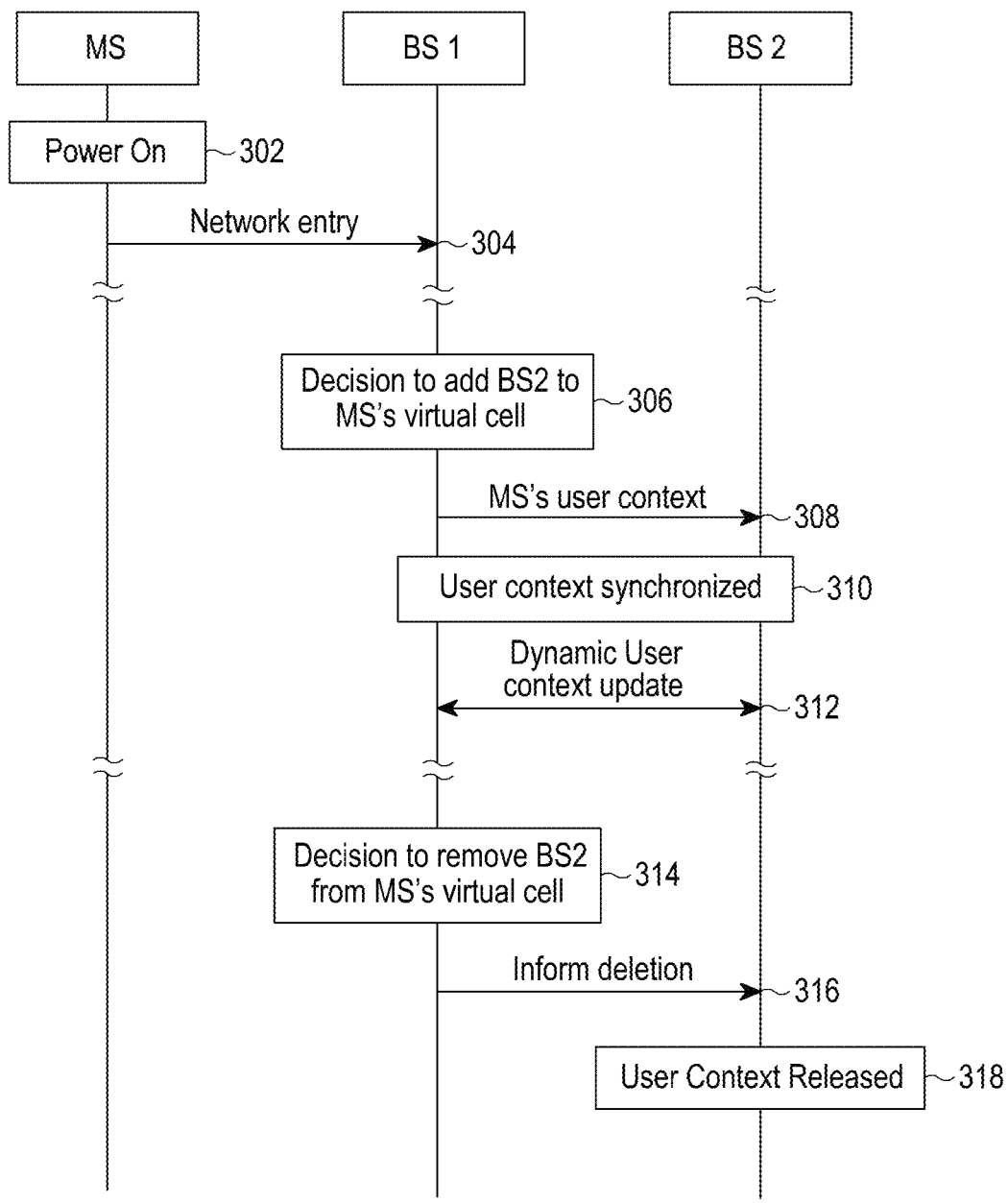
FIG. 3 illustrates a process for virtualization at Layer 2 according to an embodiment of the present disclosure.

FIG. 3 illustrates a process for virtualization at Layer 2 according to an embodiment of the present disclosure. Here, an embodiment when an MS is powered on and performs network entry for the first time is illustrated, but it should be understood that the same procedure may be applied when the MS is in operation and adds a new BS as a member of the virtual cell.

With reference to FIG. 3, the MS is powered on in step 302, and performs network entry with a BS (that is, the BS1) having a detected signal of the best quality in step 304. Thereafter, the MS may perform communication with the BS1. After performing a network entry, the BS1 determines the BS2 as a member of the virtual cell for the MS, according to a predetermined condition, a request from the MS, or the instruction from the network in step 306, and transmits a user context for the MS managed by the BS1, to the BS2 in step 308. At this point, the entire or a part of the user context may be transmitted to the BS2. For example, the user context may be loaded on a certain message, and transmitted with identification information of the MS (for example, information for identifying a cloud cell of the MS or information for identifying a user context of the MS).

The user context includes information required for providing an MS with a communication service. For example, the user context may include at least one of all identifiers (ID) for communication between an MS and a virtual cell (for example, an MS ID, a logical connection ID, an ID of a BS that configures a virtual cell, or the like), security-related information (for example, a security key, an authentication ID, a sequence number assigned by an encryption layer, a security association ID, and an encryption algorithm), QoS (Quality of service) information for each logical connector ID, a sequence number of an SDU (Service data unit) or a PDU (Protocol data unit) at Layer 2, information relating to transmission or re-transmission (for example, information relating to ARQ (Automatic Repeat Request) or HARQ (Hybrid ARQ)), a network context (for example, an authenticator ID or an anchor gateway ID). Though not shown in the drawings, a part of the user context may be transmitted from the network node to the BS1, not the BS2.

In step 310, the BS2 stores information about the MS by receiving the user context information, performs the synchronization at Layer 2 with the BS1, and finishes the process for the virtualization at Layer 2 in a virtual cell for serving the MS. Among the user contexts of the MS, dynamic context information that changes with time is updated in the BSs of the virtual cell so that the virtualization at Layer 2 is maintained in the BSs of the virtual cell.

If the signal quality from the BS2 is below a predetermined level due to the movement of the MS or the like and it is difficult to perform a communication, the BS1 determines to remove the BS2 from the virtual cell in step 314, and notifies the BS2 of the removal from the virtual cell in step 316. For example, the BS1 may instruct the BS2 to withdraw from the cloud cell of the MS by transmitting the instruction with the identification information of the MS (for example, information for identifying the cloud cell of the MS or information for identifying the user context of the MS) in step 316. In step 318, the BS2 deletes the user context of the MS which has been in service in the virtual cell.

The user contexts may be configured in the virtual cell as described below. For example, the user contexts are defined as common contexts so that all BSs in the virtual cell have the same value. For example, in an exemplary embodiment of numbering PDU sequences at Layer 2, the numbering is performed so that all the BSs that configure the virtual cell have the same sequence number with respect to one PDU. According to another embodiment, the user contexts have different values from BS to BS in the virtual cell, but a mapping rule for each BS can be defined so that the synchronization among the BSs may be performed. For example, the BSs that configure the virtual cell assign different PDU sequence numbers at Layer 2 to the PDU with the same content, but the virtualization at Layer 2 can be performed since the MS knows a mapping rule that a PDU sequence number 100 in the BS1 is used as a PDU sequence number 300 in the BS2.

In the virtualization process at Layer 2, all the BSs in the virtual cell synchronize the common user contexts so that it seems that a service at Layer 2 from one BS is provided in view of the MS.

Figure 4:
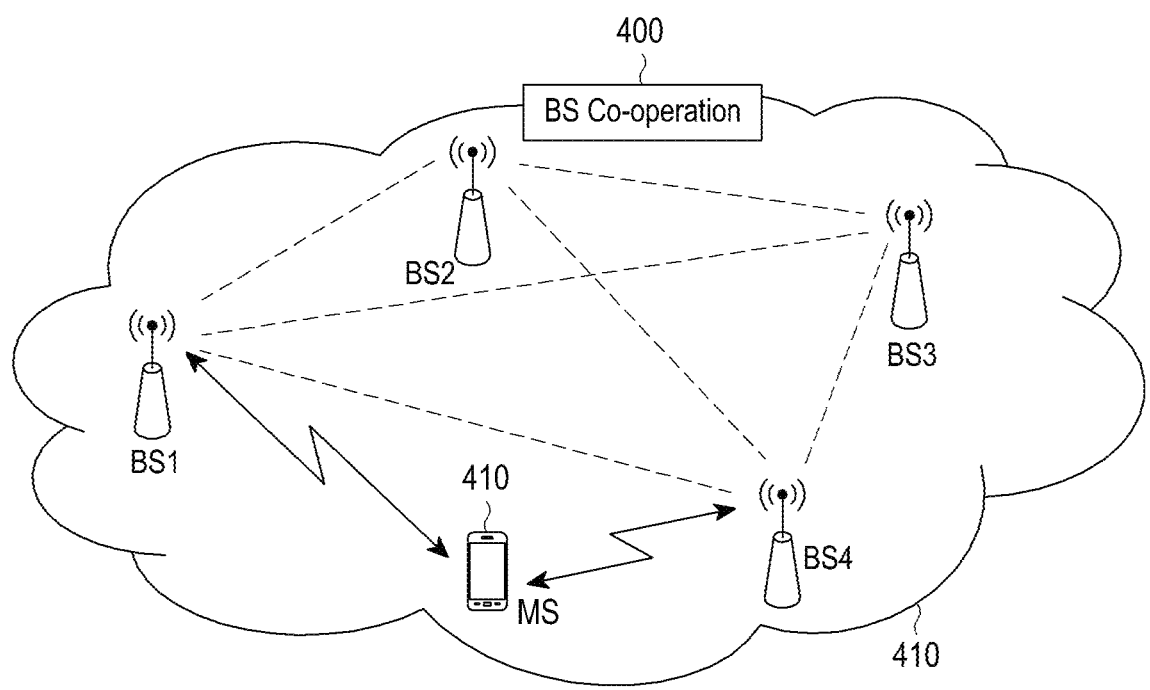
FIG. 4 illustrates cooperation among base stations in a virtual cell according to an embodiment of the present disclosure.

FIG. 4 illustrates cooperation among BSs in a virtual cell according to an embodiment of the present disclosure.

With reference to FIG. 4, in order to serve an MS 410, a virtual cell 412 of the MS 410 includes a BS1, a BS2, a BS3, and a BS4. In order to serve the MS 410, the user context of the MS 410 is shared and the dynamic user context information is frequently sent and received so that the BSs perform synchronization among BSs with respect to the user contexts. In addition, in order that the BSs transmit data to the MS 410, not only the user context but also MS data or a scheduling control message for data transmission is exchanged.

For the communication among the BSs, a logical connection that can send or receive information among them for BS cooperation 400 in a cloud cell is established. Further, since the cloud cell is configured with a plurality of BSs, a relation among the BSs is established in order to provide a decision among the BSs for a special service or to determine a representative BS that generates a control message for an MS.

FIGS. 5A to 5D illustrate communication among BSs in a cloud cell according to embodiments of the present disclosure.

Figure 5A:
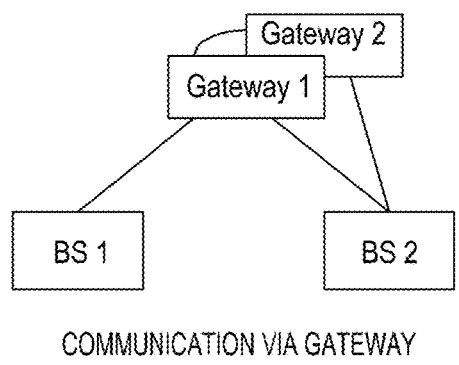
FIGS. 5A to 5D illustrate communication among base stations in a cloud cell according to embodiments of the present disclosure.
Figure 5B:
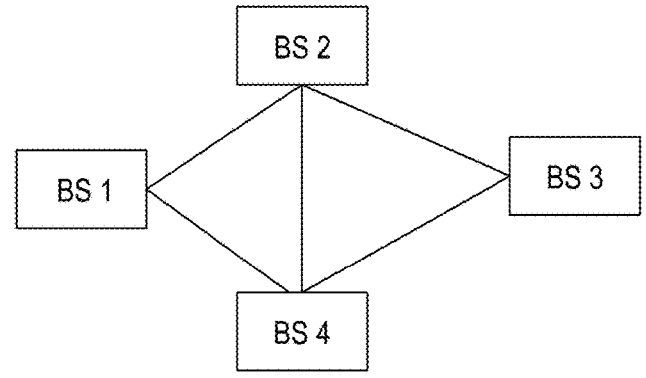

FIGS. 5A and 5B illustrate examples of physical connections for communication among BSs.

With reference to FIG. 5A, in order to connect a BS1 and a BS2 that configure a cloud cell, communication among the BSs may be performed via one gateway or more which is closer to an IP (Internet Protocol) core network than the BSs or one step farther from the MS than the BSs. For example, the BS1 and the BS2 send or receive information by wire.

With reference to FIG. 5B, the BSs that configure the cloud cell are physically connected to each other, and communication among the BSs can be performed through other BS, if a direct physical connection with a neighboring BS does not exist. In the example illustrated, the BS2 and the BS4 directly communicate with each other and the BS1 communicates with the BS3 via the BS4. For example, the BSs may send or receive information by wire or wirelessly. For a wireless communication among BSs, a wireless channel frequency that is used in communication between a BS and an MS may be re-used (In-band) or another frequency resource may be used (Out-of-Band).

Figure 5C:
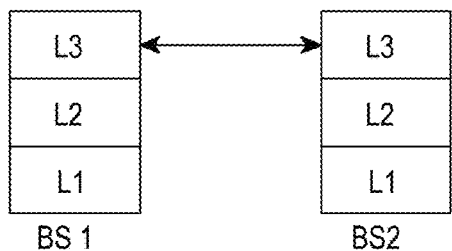
Figure 5D:
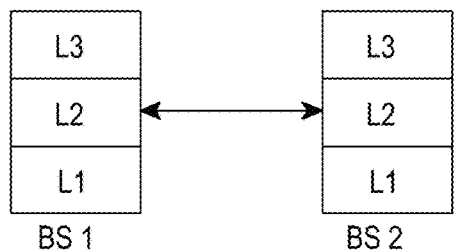

FIGS. 5C and 5D illustrate examples of a logical connection for communication among the BSs.

With reference to FIG. 5C, the BSs may send or receive information among themselves by using an IP layer (Layer 3). In this exemplary embodiment, the information sent or received for communication is in a form of an IP packet. With reference to FIG. 5D, the BSs may send or receive information to/from each other by using a MAC layer (Layer 2). In this exemplary embodiment, the information sent or received for communication is in a form of MAC PDU.

In a cloud cell, for communication among BSs, a combination of a physical connection as illustrated in FIGS. 5A and 5B with a logical connection as illustrated in FIGS. 5C and 5D is used. As an embodiment of the present disclosure, a direct communication among BSs is used physically as illustrated in FIG. 5B and a MAC layer communication is used logically as illustrated in FIG. 5D.

Figure 6:
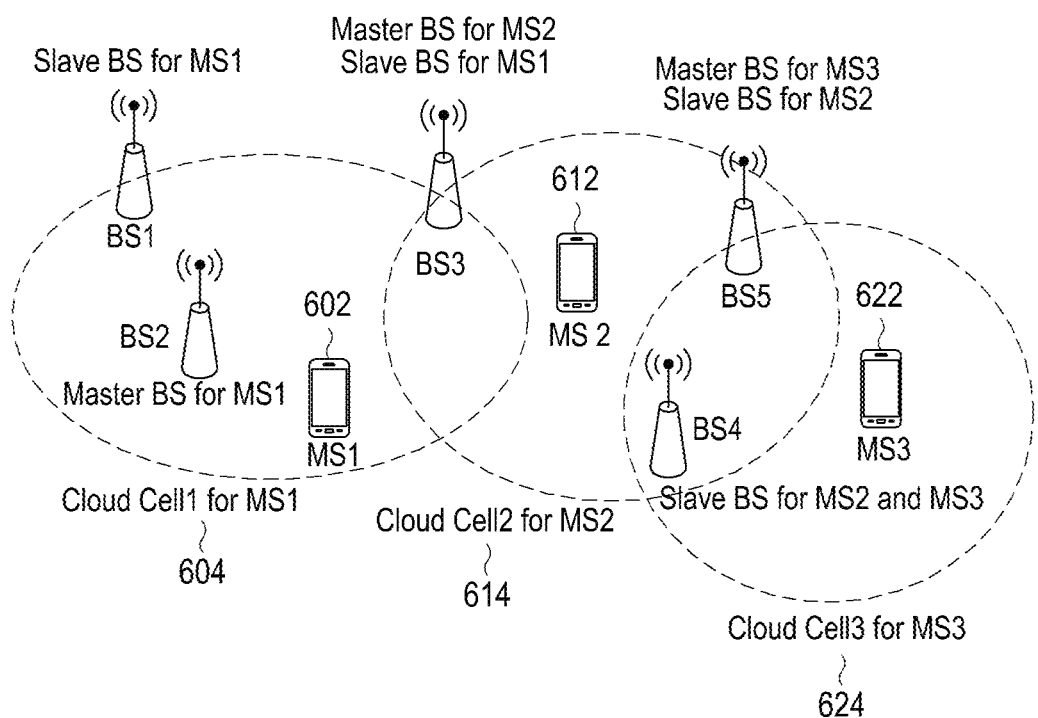
FIG. 6 illustrates relations among base stations in cloud cells according to an embodiment of the present disclosure.

FIG. 6 illustrates relations among BSs in cloud cells according to an embodiment of the present disclosure.

With reference to FIG. 6, a plurality of MSs, that is, an MS1 602, an MS2 612, and an MS3 622, exist, and cloud cells 604, 614, and 624 are configured for each of the MSs 602, 612, and 622. In more detail, the MS1 602 has the cloud cell1 604 configured with the BS1, the BS2, and the BS3, the MS2 612 has the cloud cell2 614 configured with the BS3, the BS3, and the BS5, and the MS3 622 has the cloud cell3 624 configured with the BS4 and the BS5.

In the cloud cells 604, 614, and 624 configured as described above, for providing services to each of the MSs 602, 612, and 622, common operations such as performing a common decision among the BSs or generating a control message for the MSs 602, 612, and 622 are required. In order to representatively perform the common operations, each of the cloud cells 604, 614, and 624 has a master BS, and other BSs which are not the master BS are referred to as slave BSs.

The master BS and the slave BSs are determined according to BSs, but are determined by logical role assignment in the BSs that configure the cloud cells. For example, in the cloud cell1 604, the BS3 is a master BS, and the BS1 and the BS2 operate as slave BSs, in the cloud cell2 614, the BS5 is a master BS, and the BS3 and the BS4 operate as slave BSs, and in the cloud cell3 624, the BS5 is a master BS, and the BS4 operates as slave BSs. As described above, one BS may perform a role of a master BS or a slave BS with respect to multiple MSs. For example, the BS3 operates as a master BS with respect to the MS2, and operates as a slave BS with respect to the MS1. Meanwhile, the BS4 operates as a slave BS with respect to both of the MS2 and the MS3. The role of each BS as a master BS or a slave BS is not fixed, but may be changed according to time and the movement of an MS.

The role of a master BS in each cloud cell is as follows. One BS is designated as a master BS in a cloud cell, and the master BS performs a role of an anchor that generates and manages all control information with respect to MSs in service. In view of network, the master BS performs as an anchor BS that sends or receives control information for serving an MS to or from a network node (for example, a gateway). In addition, the master BS manages user contexts for MSs, and informs slave BSs of the user contexts. Further, the master BS determines a BS that becomes a member of a cloud cell. That is, the master BS receives reports about information with respect to signal qualities from MSs, and includes, to the cloud cell of the MS, another BS with a signal quality higher than a certain level which can communicate with the MS, as a slave BS. Otherwise, the BSs with a signal quality lower than a certain level is removed from the cloud cell.

The master BS has an authority that returns a qualification as a master BS, and delegates the qualification as a master BS to another BS. Further, the master BS cooperates with the slave BSs that serve the MS so as to generate scheduling information for data communication and to forward data of the MS which is received from the network and which is to be transmitted via a downlink, to the slave BSs, or forward data received via an uplink, to a network node.

Each of the slave BSs cooperates with the master BS so as to transmit downlink data to the MS or to receive uplink data from the MS and forward the received uplink data to the master BS or the network node.

FIGS. 7A to 7D illustrate signal transmissions in a cloud cell according to an embodiment of the present disclosure. FIGS. 7A to 7D are diagrams illustrating signal transmissions during time periods of T1 to T4, respectively, wherein the time period each may be a scheduling interval. An MS 702 may transmit or receive signals from any one of a BS1, a BS2, a BS3, and a BS4 which configure a cloud cell 704. The master BS of the cloud cell 704 may determine which BS(s) is to transmit or receive signals with the MS 702 in each time period, in other words, which BS(s) is to be scheduled (that is, to be assigned for transmission/reception) to the MS 702 in each time period. Here, it is assumed that the configuration of the cloud cell 704 does not change during the periods from T1 to T4 in which the MS 702 moves in the cloud cell 704.

Figure 7A:
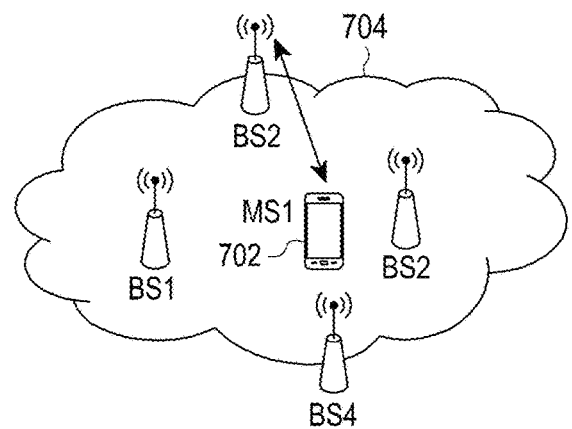
FIGS. 7A to 7D illustrate signal transmissions in a cloud cell according to an embodiment of the present disclosure.
Figure 7B:
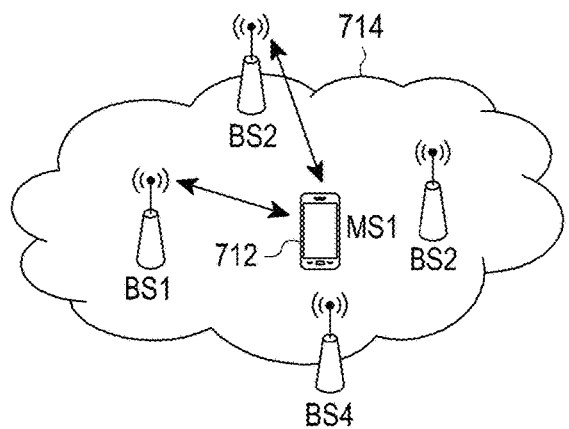
Figure 7C:
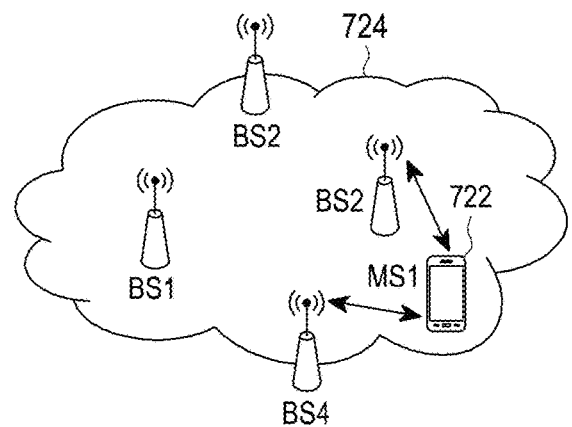
Figure 7D:
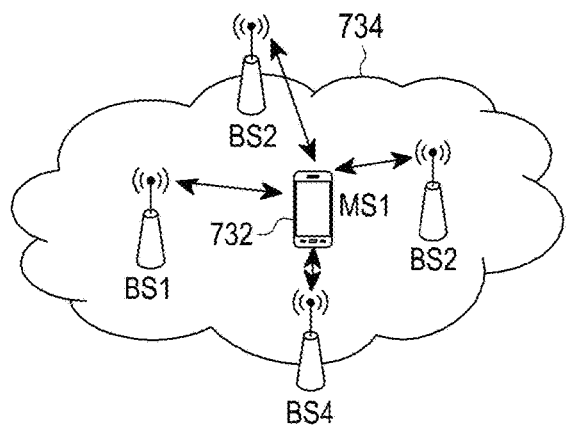

The MS 702 in time T1 transmits or receives signals from the BS2 referring to FIG. 7A, and the MS 702 in time T2 transmits or receives signals from the BS1 referring to FIG. 7B. In addition, the MS 702 in time T3 transmits or receives signals from the BS3 and the BS4 at the same time referring to FIG. 7C, and the MS 702 in time T4 transmits or receives signals from all the BSs that configure the cloud cell referring to FIG. 7D.

As described above, the MS may transmit or receive signals with the best quality by using one BS or more in the cloud cell, and may select a transmission or reception scheme optimized so as to reduce or minimize the decrease (i.e., increase) of the data yield generated in a cell border. As an example of the optimized transmission or reception scheme, coordinated multipoint transmission or reception schemes may be applied.

In performing transmission or reception with the plurality of BSs in the cloud cell, types of transmitted signals may be divided by a master BS and slave BSs so that the master BS and the slave BSs perform different roles. For example, the master BS performs a role of an anchor of a control signal, so the master BS takes charge of a transmission relating to the control signal. Meanwhile, only data of the MS which is not a control signal may be transmitted by either a master or slave BS.

In Table 1 shown below, examples of role assignments of transmissions of data or control signals for the MS in the cloud cell are listed.

TABLE 1

| | Downlink transmission control signal | Uplink reception control signal | Downlink transmission data | Uplink reception data |
|---|---|---|---|---|
| 1 | Master | Master | Master | Master |
| 2 | | | Master | Member |
| 3 | | | Member | Master |
| 4 | | | Member | Member |
| 5 | Member | Master | Master | Master |
| 6 | | | Master | Member |
| 7 | | | Member | Master |
| 8 | | | Member | Member |
| 9 | Master | Member | Master | Master |
| 10 | | | Master | Member |
| 11 | | | Member | Master |
| 12 | | | Member | Member |
| 13 | Member | Member | Master | Master |

TABLE 1-continued

| Downlink transmission control signal | Uplink reception control signal | Downlink transmission data | Uplink reception data |
|---|---|---|---|
| 14 | | Master | Member |
| 15 | | Member | Master |
| 16 | | Member | Member |

Table 1 shows a number of exemplary embodiments with respect to data transmissions and transmittable control signals using a master-slave cooperation protocol in the cloud cell. Here, "Master" refers to a master BS, and "Member" refers to one BS or more that configure the cloud cell, and can be master or slave BSs.

The control signal refers to a signal for controlling the MS which is generated at Layer 2 (a MAC layer) or Layer 1 (a physical layer) of a master BS. For example, the control signal includes at least one of scheduling information of a wireless resource for data transmission, power control information, HARQ ACK/NACK-related information, CQI (Channel Quality information), beam index in a beamforming system, and may not include a control signal in a form of a message generated at Layer 2. Further, "data" refers to data received from the network by a user or data to be transmitted to the network.

In the first exemplary embodiment of Table 1, both of the control signal and the data can be transmitted from the master BS, and the MS transmits or receives the control signal and the data to/from one BS (that is, the master BS).

In the second to sixteenth exemplary embodiments of Table 1, not only the master BS of the cloud cell but also slave BSs take part in transmission of control signals or data. The transmission of control signals/data in the cloud cell may be applied to various exemplary embodiments according to the wireless communication system environment.

Figure 8:
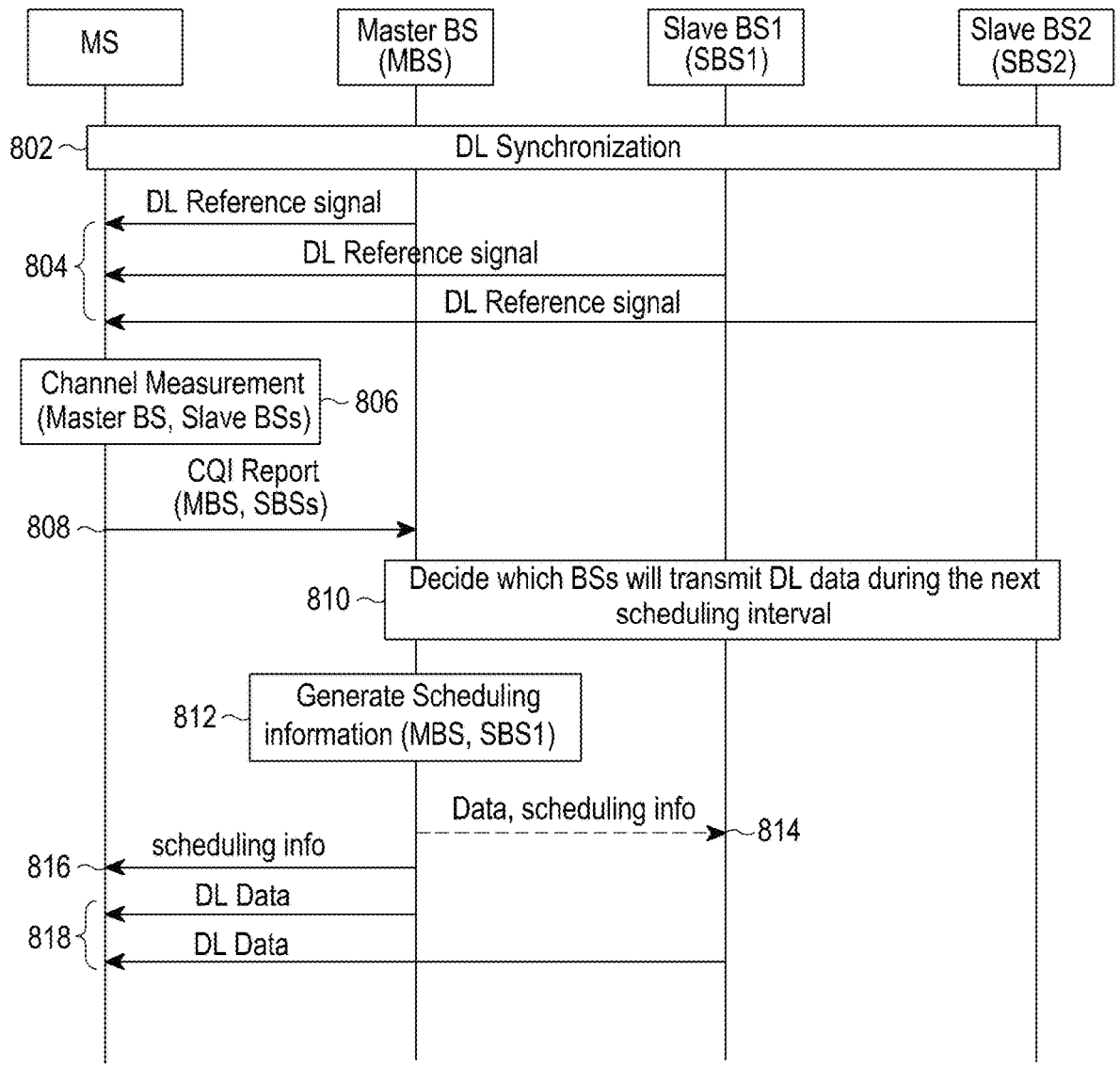
FIG. 8 illustrates a process of transmitting downlink signals from base stations that configure a cloud cell according to an embodiment of the present disclosure.

FIG. 8 illustrates a process of transmitting downlink signals from the BSs that configure the cloud cell according to an embodiment of the present disclosure. Here, the cloud cell of the MS is configured with a master BS, a slave BS1, and a slave BS2.

With reference to FIG. 8, the MS performs a synchronization process so that all the BSs that configure the cloud cell are synchronized with the downlink physical signals in step 802. According to another embodiment, the MS may perform a downlink synchronization process with the first connected BS or the master BS. Further, the master BS may share information on the downlink synchronization with the MS, with other BSs.

In step 804, all the BSs in the cloud cell transmit downlink reference signals periodically or according to a specific event. The reference signals may be configured in a digital bit sequence of a predetermined format. The MS detects the reception power of the reference signal so as to detect qualities of wireless signals of the MS and all the BSs in step 806, and the channel measurements in the downlink are transmitted to the master BS in step 808. For example, the channel measurements are reported to the master BS in a form of SNR (Signal to Noise Ratio) or SINR (Signal to Interference and noise ratio). According to another embodiment, the channel measurements may be reported to the master BS via at least one slave BS. According to another embodiment, the MS may measure qualities of wireless channel signals of all the detectable BSs in the system, and may report the channel measurements of a certain number of BSs with superior signal qualities, to the master BS. In this exemplary embodiment, the master BS may refer to the channel measurements of the BSs in the cloud cell among the reported channel measurements for scheduling.

In step 810, the master BS selects at least one BS to transmit downlink data in the next scheduling interval by using the channel measurements with respect to each BS measured in the MS, and selects an optimum transmission scheme for a download signal transmission. The transmission scheme may include a resource assignment for signal transmission at each BS, a modulation/encoding scheme, a precoding scheme, and an optimum receiving/transmitting beam for beamforming. The master BS determines to transmit data from the master BS and the slave BS1 during the next scheduling interval in step 812, and informs the slave BS1 of the scheduling information according to the decision in step 814. If the slave BS1 already knows the scheduling information, the scheduling may not be informed of According to another embodiment, the scheduling information may be transmitted to all the slave BSs. Further, the master BS transmits downlink data to be transmitted to the MS received from the network to the slave BS1.

In step 816, the master BS informs the MS of the scheduling information through the scheduling control information. As a combinable embodiment, the scheduling control information may be notified to the MS by the selected slave BS1. In step 818, the master BS and the slave BS1 transmit downlink data to the MS by using the wireless resources and transmission scheme designated by the scheduling control information. Then, the MS receives downlink data by using the wireless resources and transmission scheme designated by the scheduling control information. At this point, the master BS and the slave BS1 may transmit the downlink data by using the same or independent wireless resource and transmission scheme. According to an embodiment, the downlink data uses the same wireless resource and modulating/encoding scheme as the plurality of BSs, but the downlink data may be transmitted by using different transmission beams. Then, the MS may receive the downlink data by using different reception beams.

Figure 9:
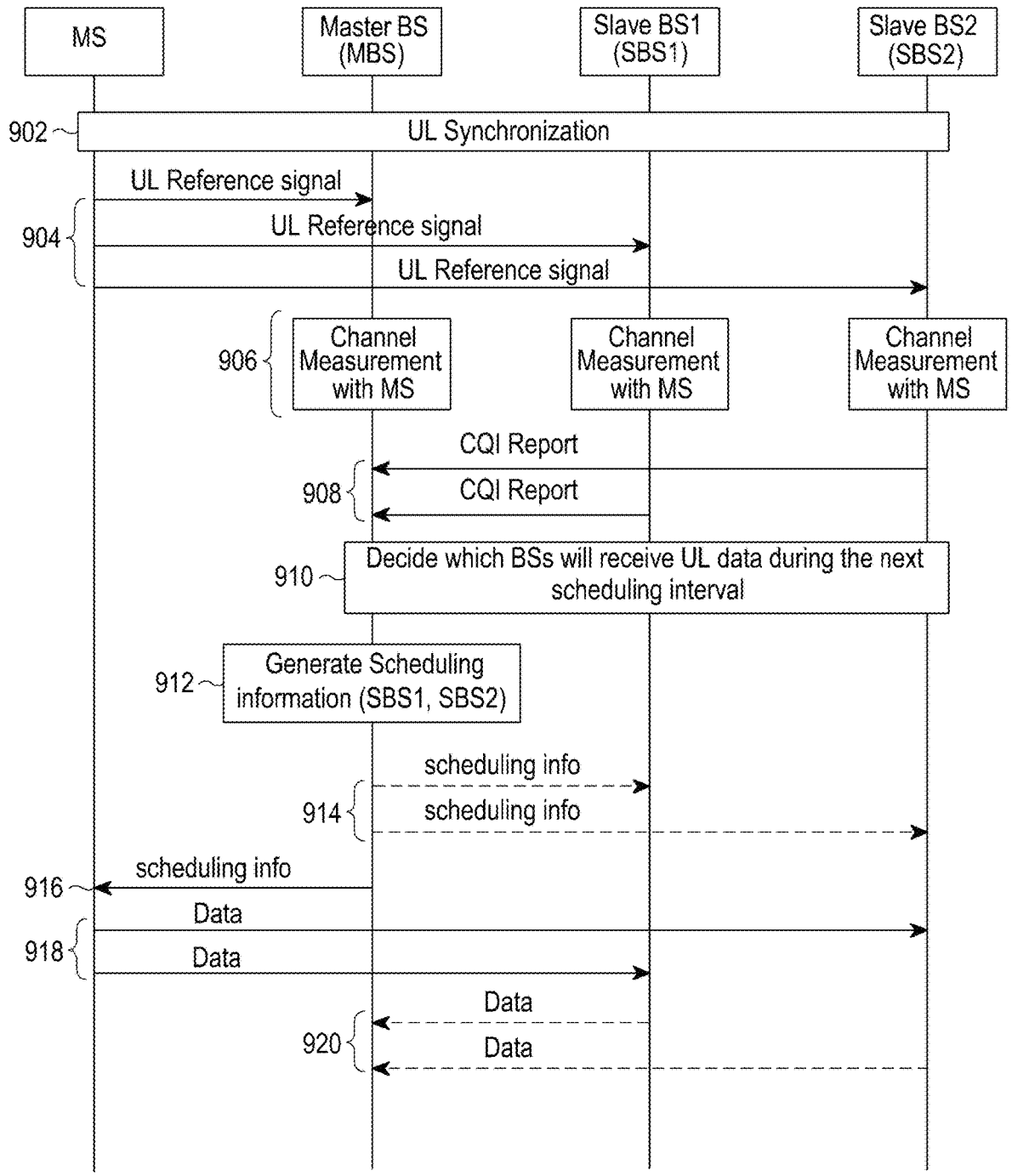
FIG. 9 illustrates a process for receiving an uplink signal in base stations that configures a cloud cell according to an embodiment of the present disclosure.

FIG. 9 illustrates a process for receiving an uplink signal in BSs that configure a cloud cell according to an embodiment of the present disclosure. Here, the cloud cell of the MS is configured with a master BS, a slave BS1, and a slave BS2.

With reference to FIG. 9, the MS performs a synchronization process so that all the BSs are synchronized with the uplink physical signals in step 902. According to another embodiment, the MS may perform an uplink synchronization process with the first connected BS or the master BS. The master BS may share the information on the uplink synchronization with the MS, with other BSs. Since the uplink physical layer synchronization is more complicated than the downlink physical layer synchronization and the MS greatly consumes power in the uplink physical layer synchronization, performing the uplink physical synchronization with a plurality of BSs may be a burden to the MS. Therefore, the burden of the MS may be reduced by performing the uplink physical layer synchronization only with the master BS, not all the BSs.

In step 904, the MS transmits the uplink reference signal periodically or according to a specific event so that all the BSs in the cloud cell receive the uplink reference signal. The reference signal is configured with a digital bit signal in a predetermined format. In step 906, each BS of the cloud cell measures qualities of wireless channel signals between the MS and each of the BSs, by detecting the reception signal of the reference signal. In step 908, the uplink channel measurements measured by the BSs other than the master BS, that is, the slave BSs are transmitted to the master BS. For example, the channel measurements may be reported to the master BS in a form of SNR (Signal to Noise Ratio) or SINR (Signal to Interference and noise ratio).

In step 910, the master BS selects at least one BS to receive uplink data by using the channel measurements measured by each of the BSs, and selects an optimum transmission scheme for uplink signal transmission. The transmission scheme may include at least one of a resource assignment for signal transmission at the MS, a modulation/encoding scheme, a precoding scheme, and an optimum receiving/transmitting beam for beamforming. The master BS determines to receive data from the MS at the slave BS1 and the slave BS2 during the next scheduling interval in step 912, and informs the slave BS1 and the slave BS2 of the scheduling information according to the determination in step 914. If the slave BSs already know the scheduling information, the scheduling may not be informed of. According to another embodiment, the scheduling information is transmitted to all the slave BSs.

In step 916, the master BS informs the MS of the scheduling information via the scheduling control information. As a combinable embodiment, the scheduling control information may be notified to the MS by the selected slave BS1. The MS that has received the scheduling control information transmits the uplink data to the slave BS1 and the slave BS2 by using the wireless resources and transmission scheme designated by the scheduling control information in step 918. Then, the slave BS1 and the slave BS2 receive uplink data by using the wireless resources and transmission scheme designated by the scheduling control information. At this point, the MS may transmit the uplink data by using the same or independent wireless resources and transmission schemes. According to an embodiment, the uplink data may use the same wireless resource and modulating/encoding scheme, and may be transmitted from the MS to the slave BS1 and the slave BS2 by using different transmission beams. Then, the slave BS1 and the slave BS2 may receive the uplink data by using different reception beams.

In step 918, the slave BS1 and the slave BS2 transmit the received uplink data to the master BS so that the master BS transmits the uplink data to the network node. According to another embodiment, if any one of the slave BSs has a connection that can transmit data with the network node, the received uplink data may be directly transmitted from the slave BS to the network node.

Figure 10A:
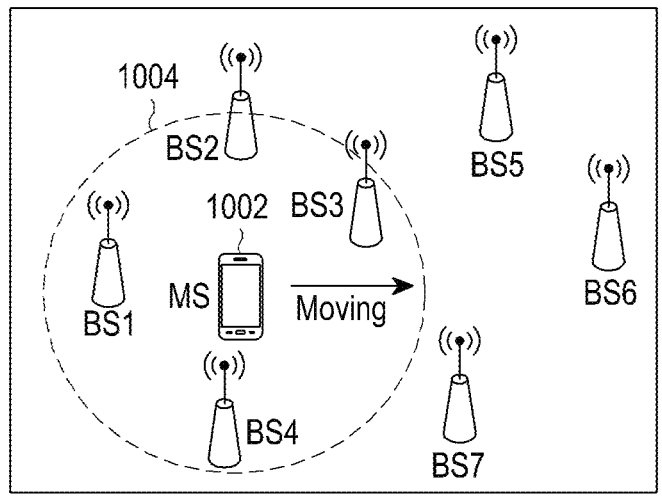
FIGS. 10A and 10B illustrate reformation of a cloud cell according to an embodiment of the present disclosure.
Figure 10B:
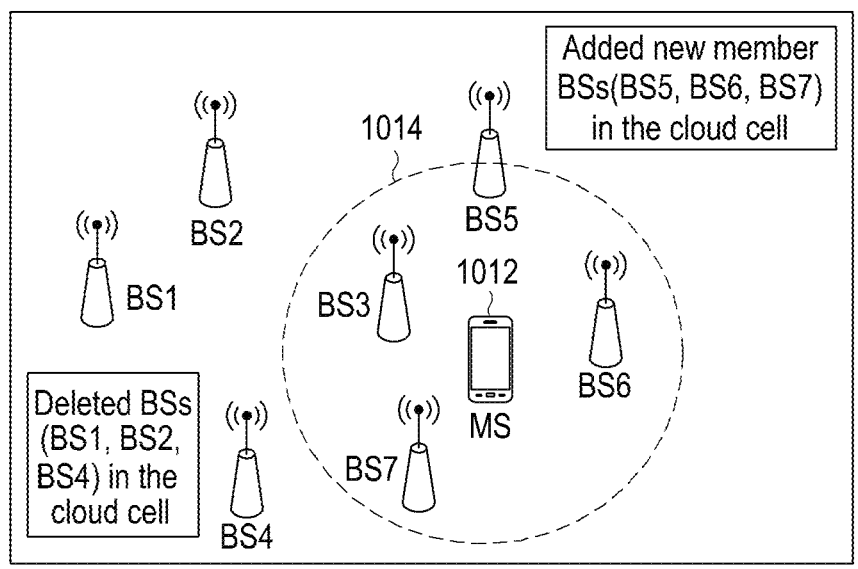

FIGS. 10A and 10B illustrate reformation of a cloud cell according to an embodiment of the present disclosure. FIGS. 10A and 10B are diagrams illustrating reformation of the cloud cell in time periods of T1 and T2, respectively. Each of the time periods may be, for example, a scheduling interval or a reformation interval of the cloud cell.

With reference to FIG. 10A, a cloud cell 1004 is configured with a BS1, a BS2, a BS3, and a BS4 for serving an MS 1002 at time T1. The configuration of the cloud cell 1004 may be changed according to the movement of the MS 1002 or the change of the wireless environment around the MS 1002. At time T2, as the MS 1002 moves to a new position 1012, new BSs of a BS5, a BS6, and a BS7 that have excellent signal qualities with the MS 1012 are added to a cloud cell 1014 of the MS 1012, and the BS1, the BS2, and the BS4 that have inferior signal qualities are removed from the cloud cell 1014.

That is, the cloud cell of the MS may constantly change according to the flow of time, the movement of the MS, the change of the wireless environment, or the like so that the cloud cell is configured with BSs that have good signal qualities. A process in which new BSs are added to the cloud cell or existing BSs are deleted is referred to as reformation of the cloud cell. The reformation of the cloud cell may be performed based on various conditions, such as the state of the wireless resources of the BSs, system loads, or a wireless signal quality of the MS, and the reformation may be determined by the master BS or performed by the request of the MS. The master BS may determine whether to reform the cloud cell, for example, according to a scheduling interval or a certain interval that can be determined independently from the scheduling interval.

Figure 11:
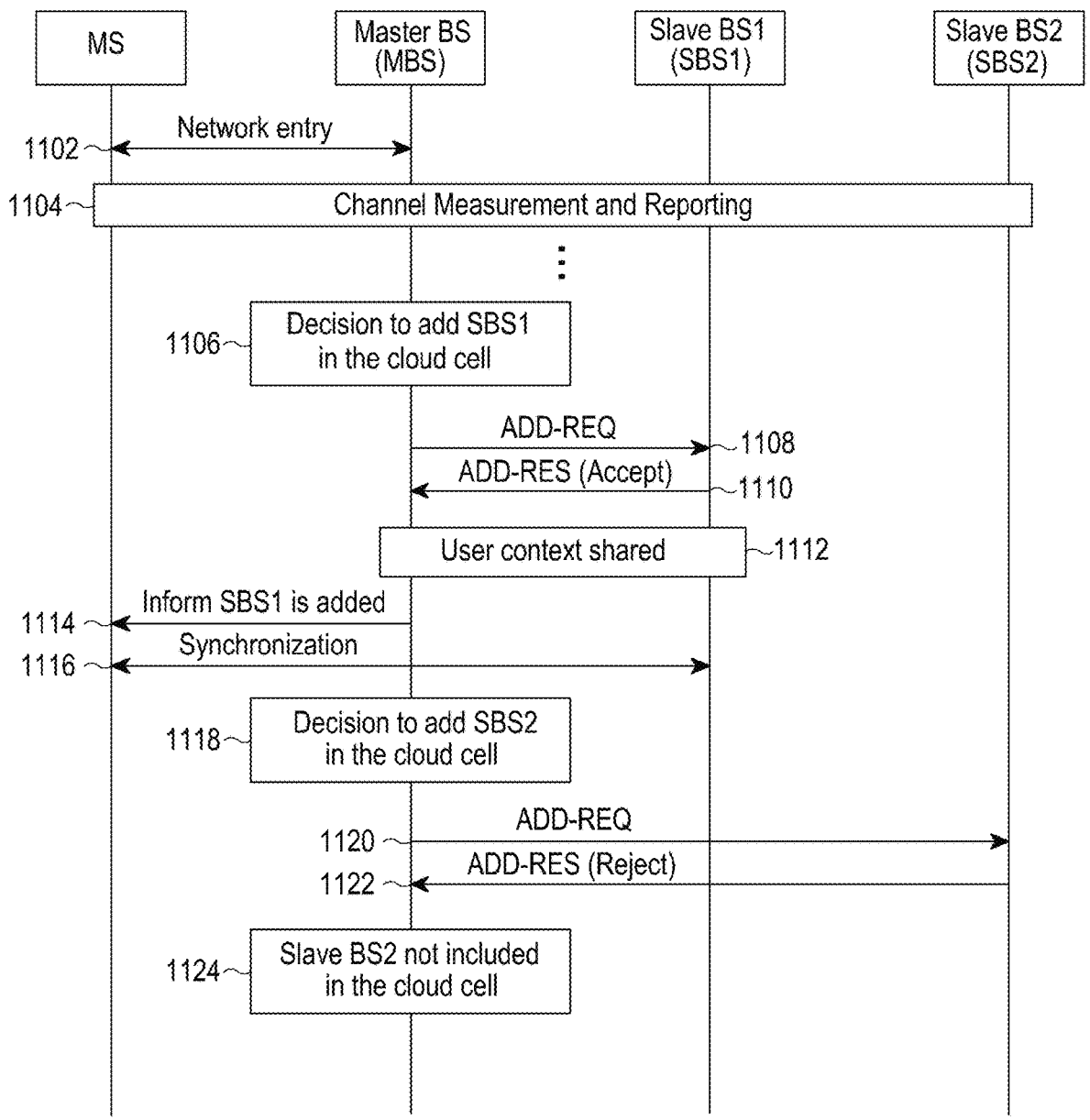
FIG. 11 illustrates a process of adding a new base station in a cloud cell according to an embodiment of the present disclosure.

FIG. 11 illustrates a process of adding a new BS in a cloud cell according to an embodiment of the present disclosure.

With reference to FIG. 11, the MS is powered on and performs a network entry with a BS that has the best reception signal quality in step 1102. The BS that performs the network entry becomes a master BS of the MS. After performing the network entry, the MS measures qualities of wireless channel signals of neighboring BSs periodically or according to an event and reports the measured qualities to the BS in step 1104. In step 1106, the master BS determines to add a BS that satisfies a certain condition among the BSs of which the signal qualities are reported from the MS, for example, at least one BS that has a signal quality better than a predetermined value, as a slave member of the cloud cell. Specifically, the master BS determines to add the slave BS1 to the cloud cell.

The master BS transmits a message for requesting to add the slave BS1 to the cloud cell of the MS, for example, an ADD-REQ message in step 1108, and receives a message for responding thereto from the slave BS1, for example, an ADD-RSP message in step 1110. The ADD-REQ message may include identification information of the MS. The ADD-RSP message may include information of accepting the addition request from the master BS. The master BS transmits the user context with respect to the MS to the slave BS1 to share the user context in step 1112, and transmits a notification message to the MS informing that the slave BS1 is added to the cloud cell in step 1114. According to another embodiment, the user context may be transmitted to the slave BS1 via the ADD-REQ message.

The MS performs a synchronization process for synchronizing the slave BS1 and the signal at the physical layer, in response to the reception of the notification message, in step 1116. The synchronization process includes, for example, downlink and/or uplink physical layer synchronization.

In step 1118, the master BS determines to add the slave BS2 as a slave member of the cloud cell based on the signal quality information reported from the MS in step 1104. The master BS transmits the ADD-REQ message to the slave BS2 in step 1120, and receives the ADD-RSP message from the slave BS2 in step 1122. The slave BS2 may determine not to accept providing the service to the MS for the reason that the slave BS2 has no available wireless resource for serving the MS, that the MS is not authenticated in the slave BS2, or the like. That is, the master-slave protocol is a logical role assignment of the BSs for serving the MS, and each of the BSs has an admission control function for independently determining whether to serve the MS. Therefore, the ADD-RSP message may include information of refusing the addition request from the master BS. In step 1124, the master BS that receives the ADD-RSP message determines not to include the slave BS2 as a member of the cloud cell.

Figure 12:
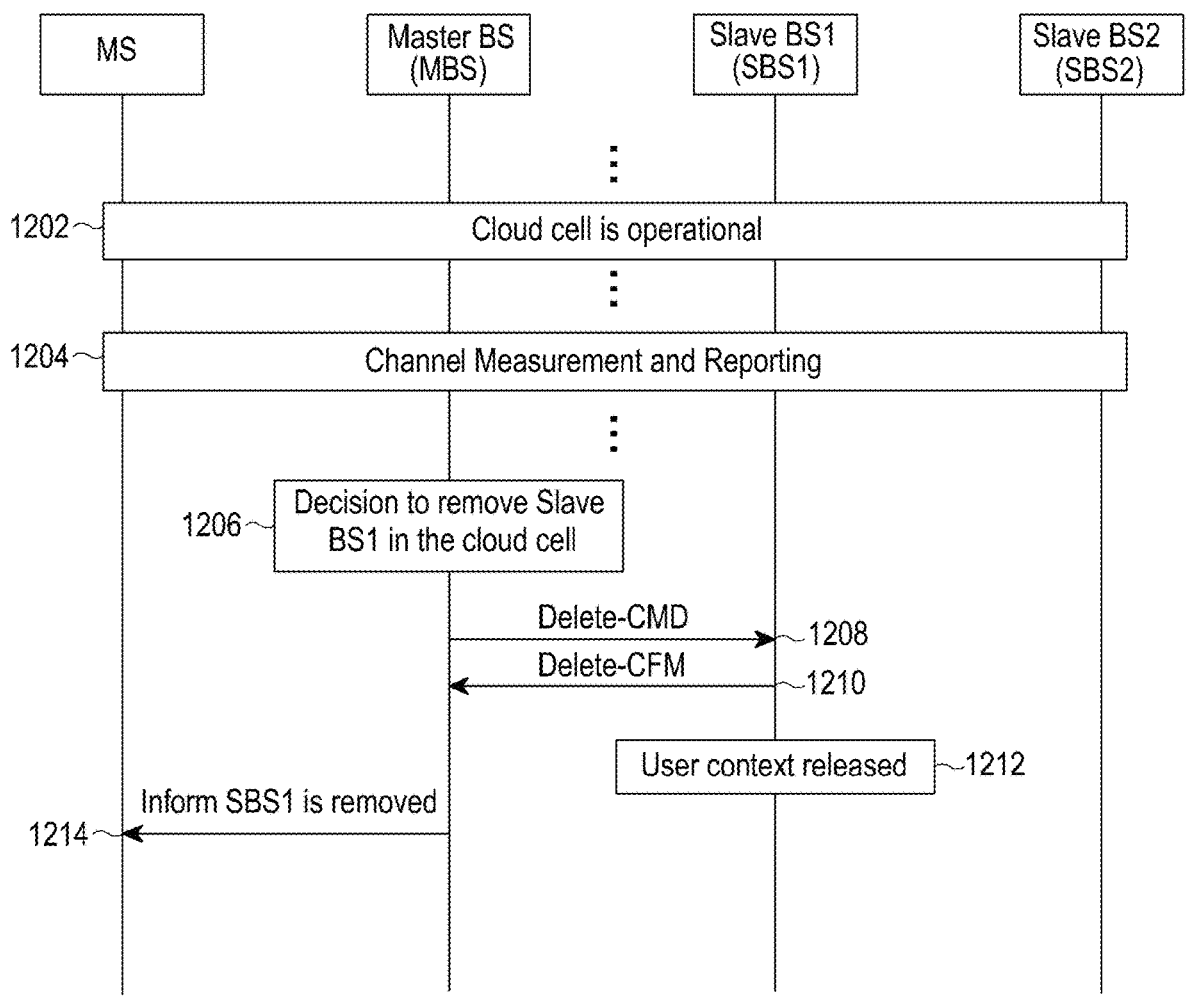
FIG. 12 illustrates a process of removing a base station member from a cloud cell according to an embodiment of the present disclosure.

FIG. 12 illustrates a process of removing a BS member from a cloud cell according to an embodiment of the present disclosure.

With reference to FIG. 12, the MS performs communication with a cloud cell configured with three BSs (a master BS, a slave BS1, and a slave BS2) in step 1202. The MS measures qualities of wireless channel signals of neighboring BSs including the three BSs and periodically or aperiodically reports the measured qualities to the master BS. In step 1206, the master BS determines to remove the slave BS1 from the cloud cell based on the report on the qualities of the signals from the MS. According to another embodiment, the slave BS1 may determine that it is difficult to serve the MS for various reasons, such as lack of wireless resources of the slave BS1 and system overload, and may request the master BS to withdraw from the cloud cell of the MS.

The master BS transmits a message for requesting the slave BS1 to be deleted from the cloud cell of the MS, for example, a Delete-CMD (Delete Command) message in step 1208, and receives a Delete-CFM (Delete Confirmation) message, as a response message to the Delete-CMD message, from the slave BS1 in step 1210. In step 1212, the slave BS1 deletes the user context stored with respect to the MS, in response to the reception of the Delete-CMD message. In step 1214, the master BS informs the MS of the deletion of the BS1 from the cloud cell, in response to the reception of the Delete-CFM message. Then, the MS stops a cloud cell operation such as a synchronization process for synchronizing with the slave BS1 and the transmission of a signal at the physical layer, and does not perform such operations any more.

Figure 13:
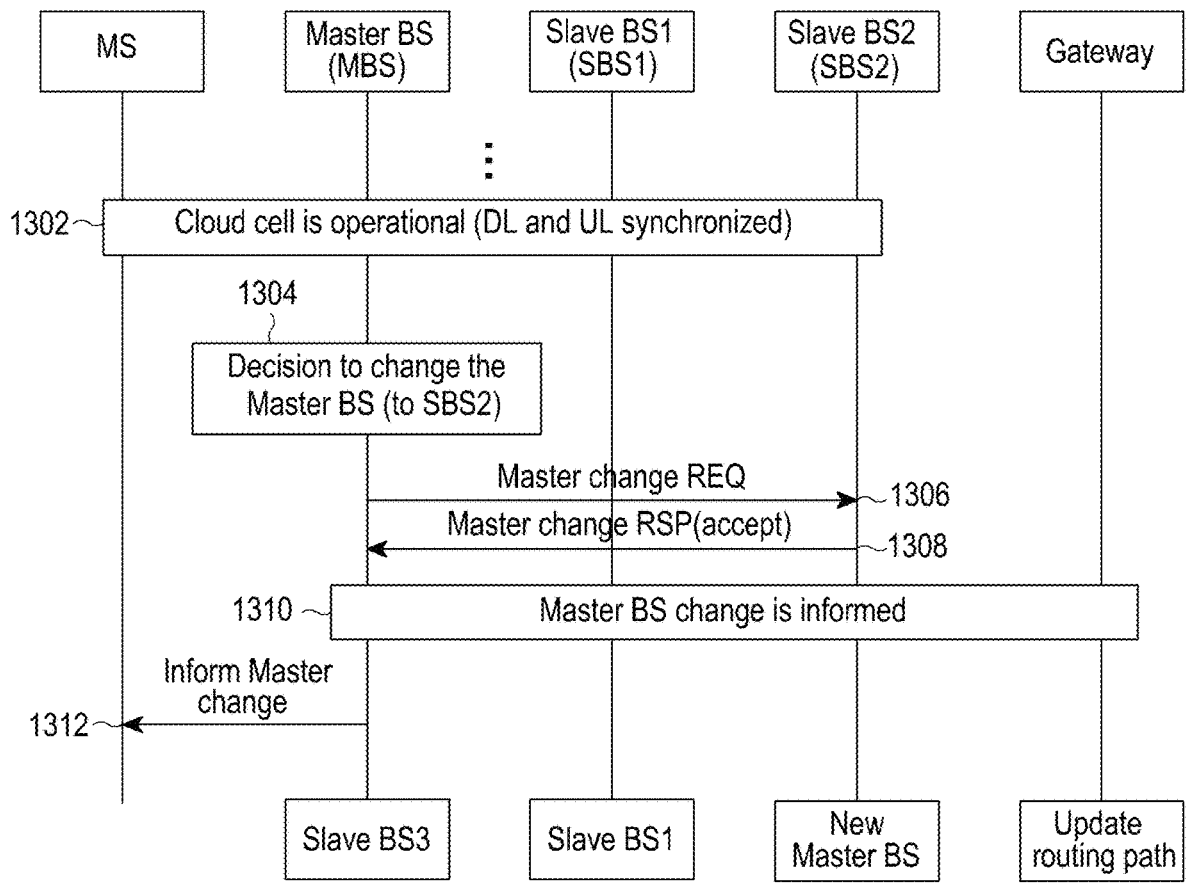
FIG. 13 illustrates a process of changing a master base station in a cloud cell according to an embodiment of the present disclosure.

FIG. 13 illustrates a process of changing a master BS in a cloud cell according to an embodiment of the present disclosure.

With reference to FIG. 13, the MS performs communication with a cloud cell configured with three BSs (a master BS, a slave BS1, and a slave BS2) and performs uplink and downlink synchronization processes at a physical layer with the three BSs in step 1302. In step 1304, the master BS determines that the BS cannot perform the role of the master BS of the cloud cell of the MS due to a certain condition. According to an embodiment of the present disclosure, the master BS may not perform the role of the master BS due to the increase of system overload, the decrease of signal quality of the MS, or other conditions. Further, the master BS may determine, for example, that the slave BS2 may be a new master BS based on a certain condition, such as the signal quality of the MS.

In step 1306, the master BS returns a qualification as a master BS, and transmits a message for transferring the qualification to another BS, for example, a master change request message, to the slave BS2. In step 1308, the slave BS2 includes information of acceptance to a message for responding to the master change request message, for example, a master change response message, and transmits the master change response message to the master BS. According to another embodiment, if it is determined that the slave BS2 may not perform the role of the master BS, the slave BS2 includes information of rejection, not the information of acceptance, to the master change response message, and transmits the master change response message. In this exemplary embodiment, the process of changing the master BS stops.

In step 1310, the master BS confirms the information of acceptance included in the master change response message, and transmits the control message informing that the master BS has been changed, to the slave BS1, the slave BS2, and the gateway that is a network node higher than the BSs. The gateway recognizes that the master BS has been changed to the existing slave BS2, and changes routing paths in order to transmit all the control information and data directed from the network to the MS, to the new master BS (that is, the existing slave BS2). Additionally, the master BS may inform the MS of the change of the master BS in step 1312.

If the process described above has been completed, the previous master BS of the cloud cell is changed to a slave BS3, and the slave BS2 is changed to a master BS and performs a role of the master BS with respect to the MS.

Figure 14:
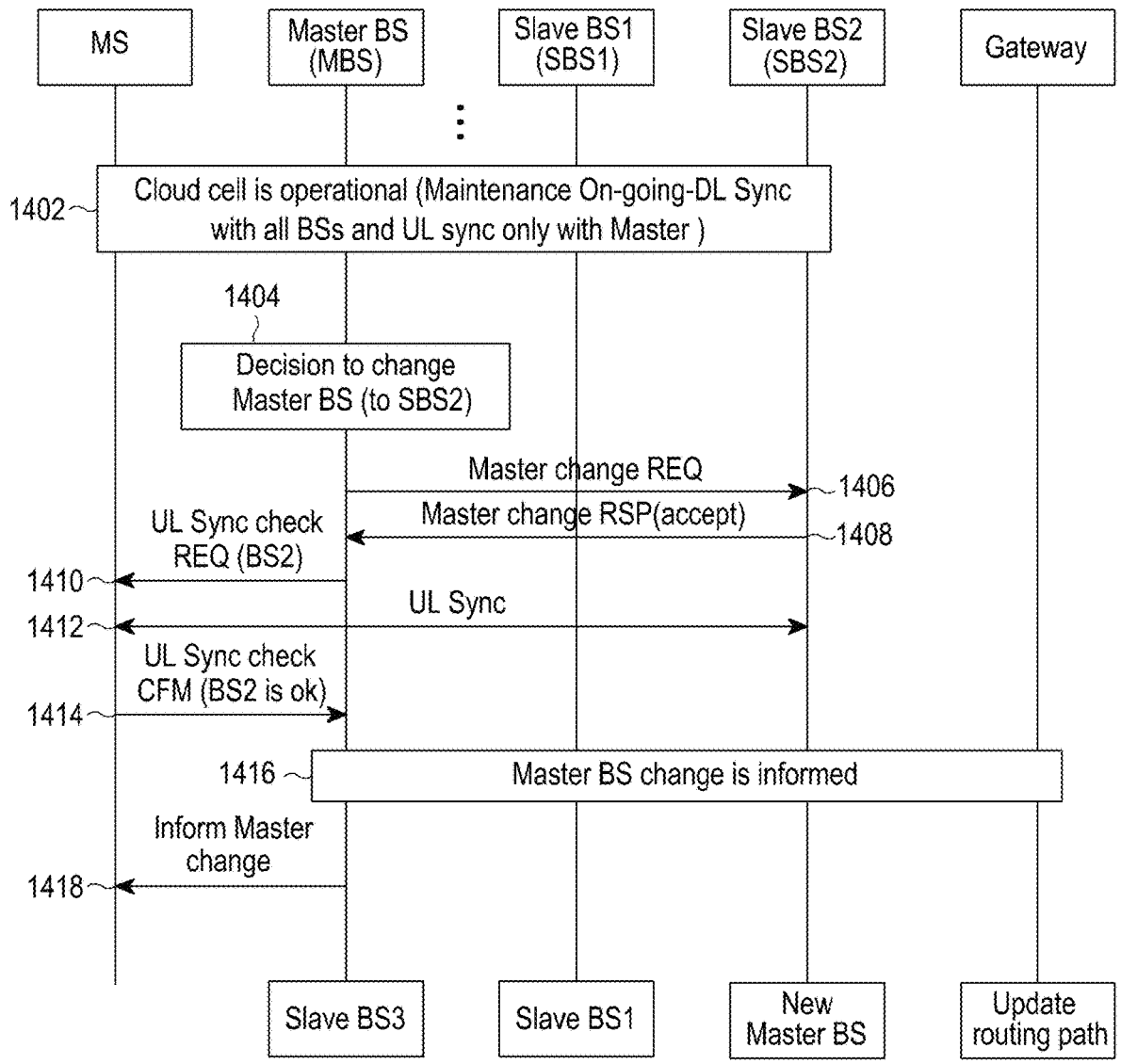
FIG. 14 illustrates a process of changing a master base station in a cloud cell according to another embodiment of the present disclosure.

FIG. 14 illustrates a process of changing a master BS in a cloud cell according to another embodiment of the present disclosure.

With reference to FIG. 14, the MS performs communication with a cloud cell configured with three BSs (a master BS, a slave BS1, and a slave BS2), performs a downlink synchronization process at a physical layer with the three BSs, and performs an uplink synchronization process at a physical layer only with the master BS in step 1402. In step 1404, the master BS determines that the BS cannot perform the role of the master BS with respect to the cloud cell of the MS due to a certain condition. Further, the master BS determines, for example, that the slave BS2 is to be a new master BS based on a certain condition, such as a signal quality of the MS.

In step 1406, the master BS returns a qualification as a master BS, and transmits a message for transferring the qualification to another BS, for example, a master change request message, to the slave BS2. In step 1408, the slave BS2 includes information of acceptance to a message for responding to the master change request message, for example, a master change response message, and transmits the master change response message to the master BS. According to another embodiment, if it is determined that the slave BS2 may not perform the role of the master BS, the slave BS2 includes information of rejection, not the information of acceptance, to the master change response message, and transmit the master change response message. In this exemplary embodiment, the process of changing the master BS stops.

In step 1410, the master BS transmits a UL Sync check request message for checking the uplink synchronization with the slave BS2, to the MS, prior to transferring the master qualification to the slave BS2. For example, the UL Sync check request message may include information on the slave BS2 to perform the uplink synchronization. In step 1412, the MS acquires correct synchronization with respect to the slave BS2, by performing a process of uplink synchronization at a physical layer with the slave BS2, in response to the UL Sync check request message. Thereafter, the MS transmits a UL sync check confirmation message informing that the uplink synchronization with the slave BS2 is successful, to the master BS in step 1414. The UL sync check confirmation message may include information indicating that the uplink synchronization with the slave BS2 is okay. If the uplink synchronization of the MS with the slave BS2 is confirmed, the master BS proceeds to the next process, in order to transfer the qualification as a master BS to the slave BS2.

In step 1416, the master BS transmits control messages to the slave BS1, the slave BS2, and a gateway that is a network node higher than the BSs. The gateway recognizes that the master BS has been changed to the existing slave BS2, and changes routing paths in order to transmit all the control information and data directed from the network to the MS, to the new master BS (that is, the existing slave BS2). Additionally, the master BS may inform the MS of the change of the master BS in step 1418.

If the process described above is completed, the previous master BS of the cloud cell is changed to a slave BS3, and the slave BS2 is changed to a master BS and performs a role of the master BS with respect to the MS.

Figure 15:
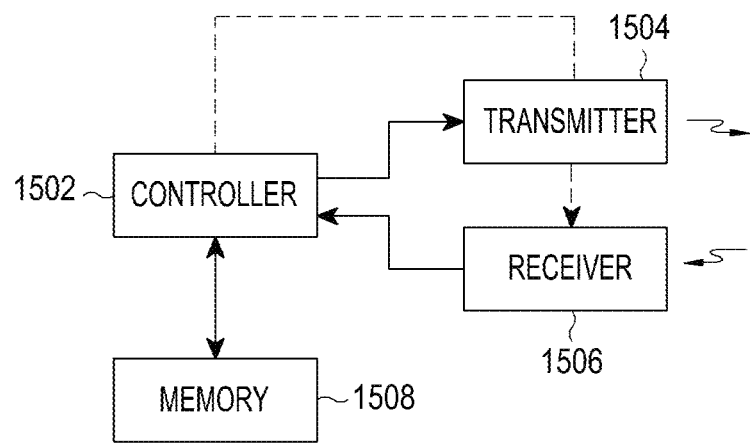
FIG. 15 illustrates a block diagram of a configuration of the MS according to an embodiment of the present disclosure.

FIG. 15 illustrates a block diagram of a configuration of the MS according to an embodiment of the present disclosure. As illustrated above, the MS is configured with a controller 1502, a transmitter 1504, a receiver 1506, and a memory 1508.

With respect to FIG. 15, the transmitter 1504 and the receiver 1506 transmit and receive wireless signals with one BS or more according to a wireless interface protocol. The controller 1502 controls the transmitter 1504 and the receiver 1506 according to at least one of the embodiments of the present disclosure, so as to receive a communication service from a plurality of BSs that configure a cloud cell. The memory 1508 stores program codes and operation parameters required for operations of the controller 1502 and the transmitter and receiver 1504 and 1506, and provides the program codes and operation parameters, if necessary.

Figure 16:
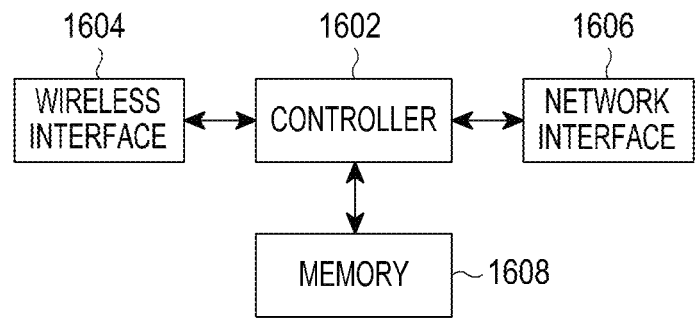
FIG. 16 illustrates a block diagram of a configuration of a base station according to an embodiment of the present disclosure.

FIG. 16 illustrates a block diagram of a configuration of a BS according to an embodiment of the present disclosure. The BS as illustrated is configured with a controller 1602, a wireless interface 1604, a network interface 1506, and a memory 1508.

With reference to FIG. 16, the wireless interface 1604 transmits and receives wireless signals with one MS or more according to a wireless interface protocol. A network interface 1606 exchanges control information and/or data with a network node or other BSs according to a predetermined protocol.

The controller 1602 controls the wireless interface 1604 and the network interface 1606 to operate as a master BS or slave BSs of the cloud cell for each of the one MS or more according to at least one of the embodiments of the present disclosure. The BS may provide a communication service to the MS singly or by communicating with other BSs under the control of the controller 1602. A memory 1608 stores program codes and operation parameters required for operating the controller 1602 and the interfaces 1604 and 1606, and provides the program codes and operation parameters, if necessary.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for serving, by a master base station, a mobile station with at least one secondary base station in a wireless communication system, the method comprising:
transmitting, to a secondary base station, an addition-request message requesting to serve the mobile station with the master base station;
receiving, from the secondary base station, a response message in response to the addition-request message;
providing a communication service to the mobile station in cooperation with the secondary base station;
receiving, from the secondary base station, a release request message to release resources of the secondary base station for the mobile station; and
transmitting, to the secondary base station, a logical connection identifier (ID) and quality of service (QoS) information related to the logical connection ID.

2. The method according to claim 1, wherein the master base station and the secondary base station are configured to physically connect to each other via a gateway.

3. The method according to claim 1, wherein the master base station and the secondary base station are configured to logically connect to each other via a layer 2.

4. The method according to claim 1, further comprising:
transmitting to the secondary base station at least one of a mobile station ID of the mobile station or a secure key.

5. The method according to claim 1, wherein a radio resource control information for the mobile station is transferred only by the master base station.

6. A master base station for serving a mobile station with at least one secondary base station in a wireless communication system, the master base station comprising:
a transceiver; and
a controller coupled to the transceiver, wherein the controller is configured to:
transmit, to a secondary base station, an addition-request message requesting to serve the mobile station with the master base station;
receive, from the secondary base station, a response message in response to the addition-request message;
provide a communication service to the mobile station in cooperation with the secondary base station;
receive, from the secondary base station, a release request message to release resources of the secondary base station for the mobile station; and
transmit, to the secondary base station, a logical connection ID and quality of service (QoS) information related to the logical connection ID.

7. The master base station according to claim 6, wherein the master base station and the secondary base station are configured to physically connect to each other via a gateway.

8. The master base station according to claim 6, wherein the master base station and the secondary base station are configured to logically connect to each other via a layer 2.

9. The master base station according to claim 6, wherein the controller is further configured to:
transmit to the secondary base station at least one of a mobile station ID of the mobile station, or a secure key.

10. The master base station according to claim 6, wherein a radio resource control information for the mobile station is transferred only by the master base station.

11. A method for serving, by a secondary base station, a mobile station with a master base station in a wireless communication system, the method comprising:
receiving, from the master base station, an addition-request message requesting to serve the mobile station with the master base station;
transmitting, to the master base station, a response message in response to the addition-request message;
providing a communication service to the mobile station in cooperation with the master base station;
transmitting, to the master base station, a release request message to release resources of the secondary base station for the mobile station; and
receiving, from the master base station, a logical connection ID and quality of service (QoS) information related to the logical connection ID.

12. The method according to claim 11, wherein the master base station and the secondary base station are configured to physically connect to each other via a gateway.

13. The method according to claim 11, wherein the master base station and the secondary base station are configured to logically connect to each other via a layer 2.

14. The method according to claim 11, further comprising:
receiving, from the master base station, at least one of a mobile station ID of the mobile station or a secure key.

15. The method according to claim 11, wherein a radio resource control information for the mobile station is transferred only by the master base station.

16. A secondary base station for serving a mobile station with a master base station in a wireless communication system, the secondary base station comprising:
a transceiver; and
a controller coupled to the transceiver, wherein the controller is configured to:
receive, from the master base station, an addition-request message requesting to serve the mobile station with the master base station;
transmit, to the master base station, a response message in response to the addition-request message;
provide a communication service to the mobile station in cooperation with the master base station;
transmit, to the master base station, release request message to release resources of the secondary base station for the mobile station; and
receive, from the master base station, a logical connection ID and quality of service (QoS) information related to the logical connection ID.

17. The secondary base station according to claim 16, wherein the master base station and the secondary base station are configured to physically connect to each other via a gateway.

18. The secondary base station according to claim 16, wherein the master base station and the secondary base station are configured to logically connect to each other via a layer 2.

19. The secondary base station according to claim 16, wherein the controller is further configured to: receive, from the master base station, at least one of a mobile station ID of the mobile station or a secure key.

20. The secondary base station according to claim 16, wherein a radio resource control information for the mobile station is transferred only by the master base station.

* * * * *